Jan. 13, 1959  P. A. HILLIARD  2,868,158
MACHINE FOR COATING CANDY CENTERS
Filed June 22, 1956  2 Sheets-Sheet 1
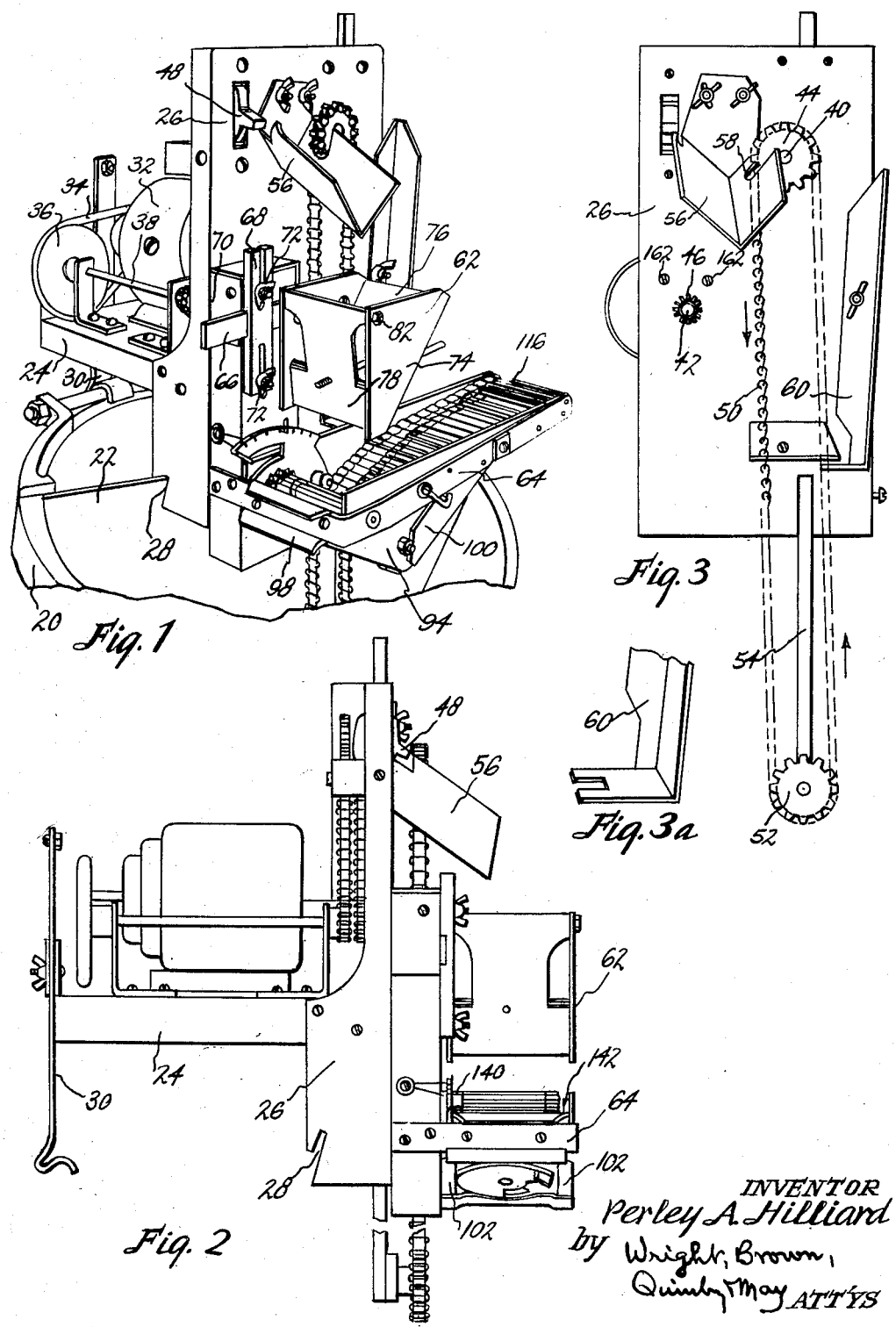
INVENTOR
Perley A. Hilliard
by Wright, Brown,
Quinby May ATTYS Jan. 13, 1959 P. A. HILLIARD 2,868,158
MACHINE FOR COATING CANDY CENTERS
Filed June 22, 1956 2 Sheets-Sheet 2
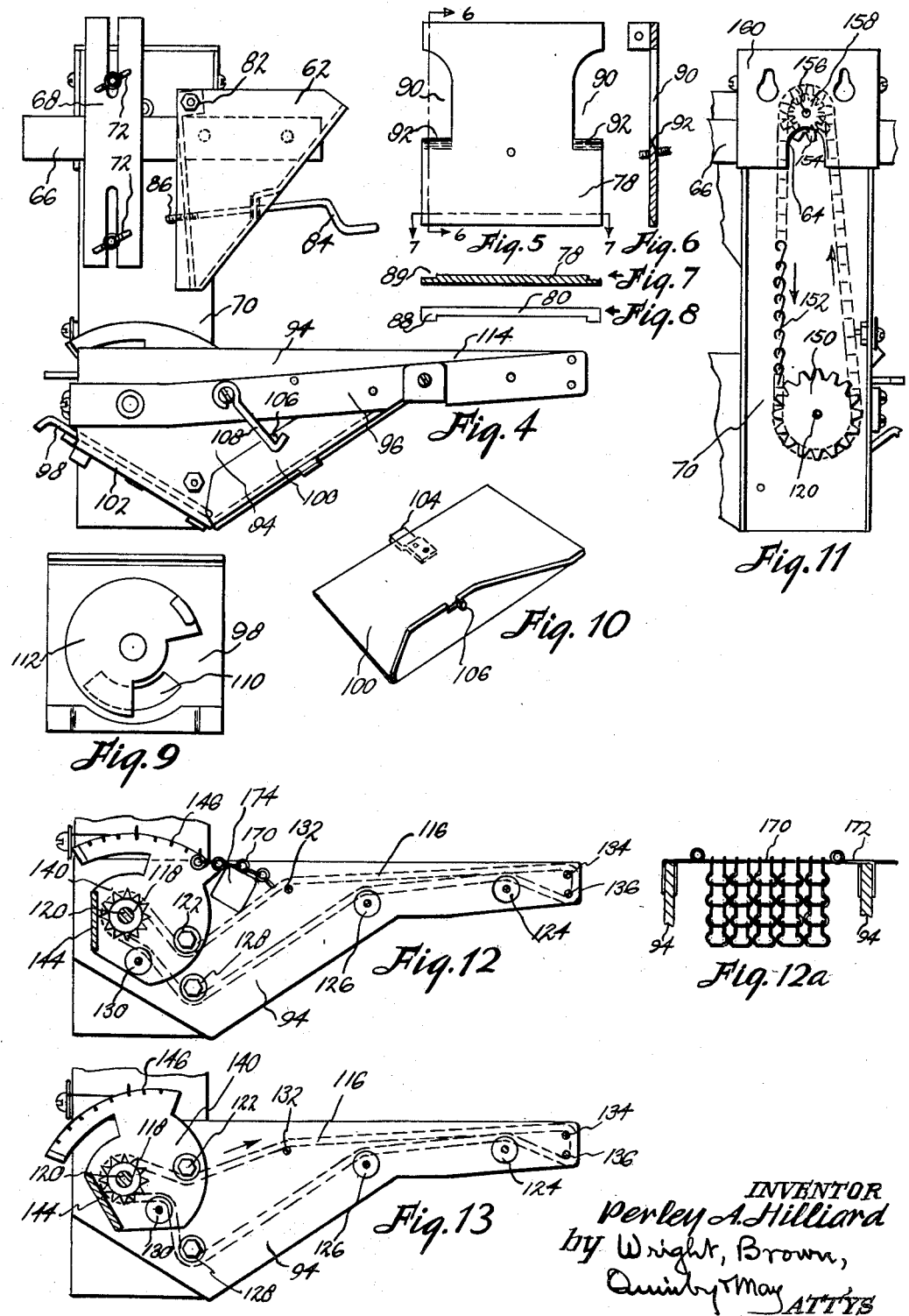
INVENTOR
Perley A. Hilliard
by Wright, Brown,
Quinby May ATTYS United States Patent Office 2,868,158
Patented Jan. 13, 1959

2,868,158

MACHINE FOR COATING CANDY CENTERS

Perley A. Hilliard, Weymouth, Mass.

Application June 22, 1956, Serial No. 593,124

8 Claims. (Cl. 118—24)

This invention relates to a machine for coating candy centers with molten chocolate. It is an object of the invention to provide a machine which is small in bulk, effective in action, easy to clean, and rapid in production. It is designed to be mounted over a reservoir of melted chocolate, as for example the kettle described and illustrated in U. S. Reissue Patent No. 16,813. The machine lifts a stream of molten chocolate from the reservoir and delivers a falling sheet or curtain of chocolate onto an open-link conveyor which carries candy centers. An operator places such centers one by one on the portion of the conveyor approaching the sheet of chocolate and removes them from the conveyor after they have passed through the chocolate curtain. The conveyor is guided by adjustable guides to move in a path such that the bottoms as well as the tops and sides of the candy centers are adequately coated before they are removed therefrom. Various advantageous features of construction will be apparent from the following description of the invention and from the drawing, of which—

Figure 1 is a perspective view of an embodiment of the invention, mounted on a kettle;

Figure 2 is a side elevation of the same;

Figure 3 is a front elevation of the machine without a certain unit which is attachable to the front wall thereof;

Figure 3a is a perspective view of a detail of Figure 3;

Figure 4 is a front elevation, on a larger scale, of the unit attachable to the front wall shown in Figure 3;

Figure 5 is an elevation of an element of the hopper shown in Figure 4;

Figure 6 is a section on the line 6—6 of Figure 5;

Figure 7 is a section on the line 7—7 of Figure 6;

Figure 8 is a contour outline of the discharge aperture of the hopper;

Figure 9 is an elevation of one of the two plates forming the bottom of a receptacle for excess chocolate;

Figure 10 is a perspective view of the other plate forming said bottom;

Figure 11 is a fragmentary rear elevation of the unit shown in Figure 4;

Figure 12 is a sectional view of the receptacle shown in Figure 4;

Figure 12a is an elevational view of a flexible drag member mounted on the receptacle; and Figure 13 is a sectional view similar to Figure 12 but with certain parts in a different position of adjustment.

An embodiment of the invention is illustrated in Figure 1, mounted on the stationary framework 20 and partition member 22 of a rotatable chocolate melting kettle. The mechanism overhangs the kettle so that excess chocolate from the enrober falls back into the kettle and is thus maintained at the optimum consistency. As shown, the enrober comprises a horizontal platform 24 with an upright frame 26 secured against the front edge thereof. To hold the enrober in place over the kettle the frame 26 is notched as at 28 to fit on the upper margin of the partition 22, and a vertical leg 30 is adjustably secured to the rear end of the platform 24 to rest on the kettle framework 20. The whole enrober can thus be readily lifted off when not in use to get it out of the way.

The platform 24 carries driving mechanism including an electric motor 32 connected by a belt 34 to a pulley 36 on a shaft 38. The latter is connected by suitable sprocket wheels and chains to two short shafts 40 and 42 journalled in the upright frame 26. On the forward end of the shaft 40 which projects from the front face of the frame 26 is a sprocket wheel 44. On the front end of the shaft 42 is a pinion 46. A switch 48 conveniently located on the frame 26 turns on and off the current for the motor 32.

To lift a stream of melted chocolate from the kettle an endless line 50 is looped around the wheel 44 and an idle wheel 52 mounted on a vertically adjustable rod 54 carried by the frame 26. For this purpose an open link chain is shown on the drawing, running between sprocket wheels 44 and 52, but other flexible elements such as a cord or wire will do. The chain 50 is long enough to dip into the pool of melted chocolate in the kettle. Chocolate which has been heated to only a few degrees above the melting point is viscous and sluggish so that although it may flow under gravity, the ascending reach of the chain 50 elevates a rope of chocolate faster than its downward flow and carries it over the sprocket wheel 44 to an inclined trough 56 which is adjustably and removably mounted on the front face of the frame 26. Part of the sprocket wheel 44 and the portion of the chain 50 thereon are disposed in a deep notch 58 in a side of the trough 56, chocolate carried by the chain 50 being scraped off by the sides of the notch to flow down the inclined trough. The amount of chocolate elevated by the chain 60 is controlled by adjustment of a notched scraper 60 toward or from the ascending reach of the chain 50, and the amount of chocolate received by the trough 56 is controlled by adjusting the trough laterally toward or from the descending reach of the chain which passes through the notch. If desired, molds for making chocolate objects can be held under the end of the trough to fill them.

For coating candy centers, a hopper 62 is mounted beneath the discharge end of the trough 56, and beneath the hopper is a receptacle 64. The hopper 62 is secured to a horizontal bar 66 which engages in a transverse notch in the rear face of a vertical bar 68. The latter is adjustably secured to the front of a casing 70 by two wing nuts 72 which are threaded on bolts projecting forward from the casing 70 through slots in the bar 68. When the wing nuts are tightened, they bind the bar 66 in adjusted position as well as the bar 68, so that the position of the hopper 62 can easily be adjusted horizontally and vertically and the hopper can be detached from the casing 70.

The hopper 62 consists of two parallel side plates 74 and two downwardly converging plates 76 and 78 the lower edges of which are closely spaced to form a narrow elongated discharge aperture 80 (Figure 8) through which melted chocolate flows in the form of a ribbon or curtain. The plate 76 is fixed to the side plates 74 but in order to make the width of the aperture 80 adjustable the plate 78 is hinged at 82 to the side plates. The bottom edge is adjusted toward and from the bottom edge of the plate 76 by a crank 84 which is journalled in the plate 76 and has a screw threaded portion 86 passing through a threaded hole in the plate 78.

A stream of viscous liquid falling freely from an aperture shrinks in cross-section as it gains in velocity. Thus a falling ribbon of viscous liquid becomes narrower and thinner. In order to offset to some extent the tendency to narrow, the edges of the ribbon are thickened by widening the aperture 80 at its ends as at 88 (Figure 8) by means of rabbet notches 89 in the side margins of the plate 78. The margins of the ribbon flowing from the aperture 80 are additionally reinforced by auxiliary streams of chocolate escaping through notches 90 in the side edges of the plate 78. These auxiliary streams run down the outer face of the plate 78 and merge with the margins of the stream of chocolate flowing from the aperture 80. To avoid the entrapment of bubbles in these auxiliary streams, the lower edges 92 of the notches 90 are beveled to sharpness. For the same reason, the lower edge of the plate 78 is beveled to a sharp edge.

Secured to the casing 70 below the hopper 62 is the receptacle 64. This consists of parallel side plates 94 with a reinforcing strip 96 and two removable bottom plates 98 and 100 attached to the side plates by any suitable means. As shown, the bottom plate 98 rests on inturned flanges 102 of the side plates. The bottom plate 100 is supported by a lug 104 at one side which extends into an aperture (not shown) in a side plate, and a lug 106 at the other side which is caught by a hook 108. The excess chocolate which falls into the receptacle from the hopper 62 escapes over the upper edges of the bottom plates 98 and 100 and also through a valve opening 110 in the plate 98. The size of this opening can be adjusted by a rotatable valve disk 112. The side plates 94 each have an extension 114 which projects beyond the upper edge of the bottom plate 100. Mounted in the receptacle is an endless conveyor belt 116 of open-mesh chain construction. This conveyor passes around a pair of driving sprocket wheels 118 mounted on a shaft 120, and guide elements such as pulleys 122, 124, 126, 128 and 130, and rods 132, 134 and 136. The rods extend from one side plate 94 to the other, and the pulleys are rotatably mounted inside of and next to the side plates 94. The course of the conveyor is illustrated in Figure 12. The upper reach extends from a loading station between the sprocket wheels 118 downward to the pulleys 122, then upward to guide rod 132, then substantially horizontally to the guide rod 134 at the discharge end of the extension of the side plates of the receptacle.

From the guide rod 134 it extends straight down to the rod 136, then back toward the loading station. The lower reach of the conveyor is supported by the pulleys 124, 126 and 128 and passes under two pulleys 128. As the conveyor slopes downward from the sprocket wheels 118 to the pulleys 122, then upward to the rod 132, these portions of the conveyor form a transverse valley or trough across which each candy center must pass. In doing so, the candy center momentarily spans the lower portion of the trough which is usually immersed in the pool of melted chocolate in the receptacle 64. This results in a thorough coating being applied to the bottom of the candy center. If little or no coating of chocolate is desired on the bottoms of the candy centers, the guiding pulleys 122 are raised, as shown in Figure 13, to flatten the trough and elevate its bottom above the level of the melted chocolate pool. The guide pulleys 130 are also elevated at the same time to take up the slack in the conveyor which would otherwise result from the raising of the pulleys 122. For convenience in adjusting the pulleys 122 and 130, they are mounted on a bracket consisting of a plate 140 and a somewhat similar plate 142 (Figure 2) joined together by a cross-member 144. The bracket pivots about the shaft 120 as an axis and is held in adjusted angular position by a latch which engages in any one of a number of notches 146 in an edge of the plate 140.

To drive the conveyor 116, a sprocket wheel 150 is mounted on the end of the shaft 120 which projects into the casing 70 through the wall thereof. The sprocket wheel 150 is connected by a chain 152 to a sprocket wheel 154 which is carried by a shaft 156 which projects from the casing wall. Rotatable with the sprocket wheel 154 is a pinion 158 coaxial therewith. This pinion meshes with and is driven by the pinion 46 when the casing 70 is mounted in place on the front of the frame 26. For quick and easy removal, the casing 70 has a short rear wall 160 at its upper end with two key-hole apertures therein to engage over corresponding headed elements 162 on the frame 26. When the casing 70 is mounted in place on the front of the frame 26, the rear wall 160 extends down behind the pinion 46, a notch 164 being provided in the rear wall to accommodate the shaft 42. The entire assembly attached to the casing 70 can thus be lifted therewith from the frame 26 and taken apart for cleaning.

When the device is in use, the chain 50 raises a steady rope of melted chocolate from the kettle into which it dips. Some of the chocolate is removed from the chain by the trough 56 from which it flows and falls into the hopper 74. From the hopper the chocolate emerges as a ribbon or curtain the margins of which are reinforced to avoid excessive shrinkage of width while falling. Candy centers are placed on the conveyor at the loading station, one by one and are carried into and out of the trough formed by the conveyor under the hopper. In the trough the candy centers pass through the curtain of melted chocolate which falls from the hopper. Excess chocolate falls into the receptacle 64 and escapes through the valve opening 110 or over the upper edges of the bottom plates 98 and 100.

To ensure complete coating of the faces of cubically shaped candy centers, a flexible drag member may be removably mounted over the receptacle just beyond the point where the chocolate curtain falls from the hopper 62. The drag may be in the form of a chain net 170 supported by a transverse wire 172 with bent portions fitting on the walls 94 of the receptacle 64. The net 170 hangs freely from the wire 172 and is engaged by successive candy centers 174 which are carried along by the belt 116 from the loading station. When a candy center engages the net 170 it swings it to a position somewhat as illustrated in Figure 12. As the candy center advances, the net 170 drags on the top of it and causes it to roll backward in the puddle of chocolate in the receptacle 64, thus completely coating all of its faces.

Melted chocolate when of the right consistency is cohesive so that the coated centers tend to adhere to the conveyor. To remove the coated centers, the operator places the tines of a small fork on the top of each coated center and follows the coated center when it turns down and then under at the guide rods 134 and 136. When it passes the latter rod, the candy center is in the inverted position with a fork under it. The fork is manipulated to pull the candy center gently downward to separate it from the conveyor. The coated center is then righted and deposited upright on a convenient tray or shelf to complete the cooling and setting operation.

I claim:

1. Mechanism for enrobing candy centers, comprising an upright frame, a trough projecting forward from said frame and open at its outer end, power-driven means for supplying a stream of melted chocolate into said trough, a hopper adjustably and removably attached to said frame beneath the open end of said trough, said hopper having an elongated narrow discharge aperture at its bottom, a receptacle mounted on said frame below said hopper, an endless open-link conveyor in said receptacle having a portion directly under said aperture, and means for driving said supplying means and said conveyor.

2. In a machine for enrobing candy centers, a hopper adapted to receive a stream of melted chocolate and to discharge the chocolate in the form of a broad ribbon, said hopper comprising two parallel side plates and two downwardly converging plates mounted between said parallel plates with their lower edges spaced to form a narrow apertures, and means for adjusting one of said converging plates to vary the width of said aperture, one of said converging plates having a notch in each of its side edges for the outflow of melted chocolate to reinforce the margins of the ribbon of chocolate being discharged through the narrow aperture at the bottom of the hopper and to prevent overflow of excess chocolate over the top of the hopper walls.

3. Mechanism as in claim 2, the bottom edge of one of said converging plates being notched at its ends whereby said narrow aperture is widened at its ends.

4. In a machine for enrobing candy centers, a frame, a receptacle detachably mounted on said frame, said receptacle comprising parallel side plates and V bottom consisting of two downwardly converging plates, an endless open-link conveyor partly in said receptacle having an upper reach adapted to be driven from a loading station at one end of said receptacle to a discharge station at the other end, and guide elements in said receptacle arranged so that said upper reach of the conveyor dips downward and then abruptly upward at the loading end and then extends approximately horizontally to the discharge station.

5. Mechanism as in claim 4, said receptacle including side plates having an upper marginal portion projecting beyond the V bottom and supporting some of said guide elements and conveyor outside of and offset from said V bottom.

6. Mechanism as in claim 4, and a drag member consisting of a flexible net-work of links freely suspended over said conveyor and extending transversely thereof in the path of candy centers travelling on said conveyor to be engaged by said candy centers and to roll them over as they are carried under it.

7. Mechanism as in claim 6, said drag member being suspended at a point above the upwardly moving portion of said conveyor.

8. In a machine for enrobing candy centers, a frame, a receptacle detachably mounted on said frame, an endless open-link conveyor carried by said receptacle, means for driving said conveyor, said conveyor having an upper reach extending from a loading station to a discharge station and a lower reach extending from said discharge station back to said loading station, means for maintaining a pool of melted chocolate in said receptacle, means for guiding said upper reach from said loading station down into said pool and out again, then horizontally to said discharge station, and means for guiding said lower reach back from said discharge station below and nearly in contact with said horizontal portion of said upper reach then down into said pool and up again at said loading station.

References Cited in the file of this patent

UNITED STATES PATENTS

| | | |
|---|---|---|
| 790,184 | Carlson | May 16, 1905 |
| 866,702 | Weeks | Sept. 24, 1907 |
| 991,919 | Werner | May 9, 1911 |
| 1,417,086 | Massarella | May 23, 1922 |
| 1,460,189 | Woolf | June 26, 1923 |
| 1,499,347 | Conte | July 1, 1924 |
| 1,586,386 | Savy | May 25, 1926 |
| 1,957,961 | Hunter | May 8, 1934 |
| 1,994,396 | Kilner | Mar. 12, 1935 |
| 2,560,487 | Schugart et al. | July 10, 1951 |